United States Patent [19]

Desai

[11] Patent Number: 4,524,109

[45] Date of Patent: Jun. 18, 1985

[54] RECORD TURNTABLE AND POLYMERIC COATING THEREON

[75] Inventor: Nitin V. Desai, Hightstown, N.J.

[73] Assignee: RCA Corporation, Princeton, N.J.

[21] Appl. No.: 487,917

[22] Filed: Apr. 22, 1983

[51] Int. Cl.³ .................... B32B 27/32; B05D 1/02; C08F 10/00

[52] U.S. Cl. .................... 428/523; 428/908.8; 428/909; 369/264; 369/271; 427/421; 427/422; 525/98; 526/347; 526/348.7

[58] Field of Search .......... 369/271; 526/347, 348.7; 428/908.8, 909, 523; 427/421, 422; 525/98

[56] References Cited

U.S. PATENT DOCUMENTS 3,984,112  10/1976  Marks et al. .................... 369/271

OTHER PUBLICATIONS

Billmeyer, Jr., F. W., "Textbook of Polymer Science", 2nd ed., Wiley-Interscience (1971), pp. 397–398.
Product Brochure entitled "Kraton, Thermoplastic Rubber Crumb", Sc: 198-80, Printed in USA 7/80 5M, Shell Chemical Company.

*Primary Examiner*—Paul R. Michl
*Assistant Examiner*—Fred Teskin
*Attorney, Agent, or Firm*—Birgit E. Morris

[57] ABSTRACT

A thin coating of poly(isobutylene) is applied to the edge of a record turntable to prevent the record on the turntable from slipping during acceleration and deceleration of the turntable for playback.

3 Claims, No Drawings

RECORD TURNTABLE AND POLYMERIC COATING THEREON

This invention relates to a friction coating for disc turntables to prevent disc slippage during acceleration and deceleration of the turntables.

BACKGROUND OF THE INVENTION

High density information discs, such as video discs, carry much more information thereon than audio discs for example, and consequently pass a readout stylus at a much faster rate. For example, the usual audio discs revolve at about 33–78 rpm, whereas capacitance electronic discs, for example, revolve at about 450 rpm. If such a disc is placed on a smooth turntable, the disc will slip vis-a-vis the turntable during acceleration, which takes about five seconds to go from zero to 450 rpm and during deceleration, which takes about three seconds to go from 450 to zero rpm. Such slippage can damage the electronic disc and the readout stylus if the stylus sets down while the disc is not revolving at the expected rate.

Thus the turntable is being coated, at least at its periphery, with a comparatively thick, i.e., about 30/1,000" strip of cast PVC foam, or a foam rubber which can be natural or polyurethane rubber, for example. These strips are glued onto the edge of the turntable. This method is very expensive, both due to the material cost and to the high labor cost of applying the strip.

Several attempts have been made to spray-apply a friction coating to the turntable surface, which results in a much thinner coating and is much cheaper to apply. However, they have either been too tacky, which attracts dust or the like, or they have rapidly worn away after only a few plays of the disc.

Thus the search has continued for a friction coating which can be readily applied and which will withstand numerous plays.

SUMMARY OF THE INVENTION

I have found that a composition of poly(isobutylene) in a suitable solvent can be readily and inexpensively applied to a turntable or like surface as a friction coating that will prevent disc slippage through very rapid acceleration and deceleration cycles.

DETAILED DESCRIPTION OF THE INVENTION

The requirements for a non-slip, or friction, coating are fairly stringent. The coating material must be able to be applied inexpensively and rapidly to a tacky-free state in a factory environment; it must have sufficient friction to prevent slippage of a plastic disc during rapid acceleration and deceleration, e.g., the disc must not still be spinnning when it is lifted from the turntable after play, or spinning at a lower rate than the turntable after stylus set-down, which may result in chipping, cracking, or even breakage of the disc; the material must be long-wearing, i.e., remain in place for thousands of plays; it must be environmentally and chemically stable; and yet the coating must allow sufficient slip of the disc so as to allow it to be centered on a spindle in an automated fashion.

During play the disc is supported on the turntable by a bead around the edge of the disc, and by a spring-loaded spindle in the center of the turntable. The net down force of the disc on the turntable is about 70 grams of force, thus the coating on the turntable must be able to generate sufficient friction to overcome about 70 grams of force during acceleration and deceleration.

However, if the friction generated is too high, the disc may not be centered during playback. The disc is inserted into the player and is tipped downwardly until the edge of the disc touches down on the rear of the turntable, now stationary. The front of the disc is next lowered over the center spindle and until the whole edge of the disc rests on the edge of the turntable. If the disc is not exactly centered when it first touches down, it must be able to be slipped enough to center on the spindle. If it is not centered during playback, the viewer will see a shaky picture and some damage may also result to the playback stylus and stylus arm.

Poly(isobutylene) having a weight average molecular weight in the range of about 50,000–100,000 is an ideal material for the present application. It can be readily dissolved in a wide variety of solvents and thus can be applied to a turntable rapidly and inexpensively by dipping, spraying, painting on with a brush, or wick, and the like. Since it is important that the solvent evaporate quickly, the solvent should be chosen for its environmentally safe properties, its ease of evaporation, and its cost. Further, the minimum amount of solvent required to apply a desirably thin coating will be used. The relative concentration of the poly(isobutylene) solution is not critical, but in general a concentration of from about 4–7% by weight will be used. The presently preferred concentration to obtain a thin, uniform, effective coating is about 5% by weight.

The poly(isobutylene) can be used by itself, but since poly(isobutylene) of the preferred molecular weight is very slightly tacky after evaporation of the solvent, a modifier can be added to reduce the tackiness. For example, block copolymers of styrene and isoprene, or block copolymers of styrene and ethylene or propylene can be employed in minor amounts, i.e., less than about 15% by weight of the poly(isobutylene). The modifier will be used to reduce the surface tackiness of the poly(isobutylene), but should not be employed in such amounts as to adversely affect the friction characteristics of the poly(isobutylene) coating. The presently preferred range of modifier is from about 5–15% by weight of the poly(isobutylene).

The invention will be further illustrated by the following examples, but the invention is not meant to be limited to the details described therein.

EXAMPLES 1–3

Solutions were made by dissolving (a) 5 grams of poly(isobutylene) having a weight average molecular weight of about 50,000 in 100 ml of a mixture of trichloroethylene and tetrachloroethylene (80:20 by volume) and (b) 5 grams of Kraton G 1652, a thermoplastic copolymer rubber of a styrene block copolymer of the Shell Chemical Company, in the same solvent, warming to about 70° C.

The solutions (a) and (b), after cooling to room temperature, were combined in a ratio by volume of 85:15 (Example 1), 90:10 (Example 2), and 95:5 (Example 3), respectively, of poly(isobutylene) to Kraton G 1652 styrene block copolymer rubber.

The solutions were sprayed along the rim of a series of video disc player turntables and each turntable inserted into a player.

A freshly lubricated capacitance electronic disc was inserted into the player and the slippage of the disc during acceleration up to 450 rpm in five seconds, and deceleration from 450 to zero in three seconds, was noted. No disc slippage occurred during play over the next eight days.

The turntables were then exposed to ozone-enriched air, intended as a ten-year life, or aging, test. Still no disc slippage occurred during playback.

EXAMPLE 4

A 5% solution of poly(isobutylene) having a weight average molecular weight of about 50,000 in various solvents (trichloroethylene, xylene, and a mixture of methyl ethyl ketone and xylene) was sprayed onto several batches of turntables and tested with capacitance electronic discs.

No slippage was noted for any of the test discs during eight days of playback, nor after exposure of the turntables to ozone.

One set of samples was exposed to a bake at 150° F. for 48 hours to remove all solvent. No slippage was noted.

Another set of samples was sprayed with a 1200 Å thick layer of the lubricant used to overcoat the capacitance electronic discs. No slippage was noted for normal discs, and the discs and turntables stopped at the same time in all cases.

One batch was subjected to testing over 2800 cycles of load, acceleration, brake or deceleration, and unload. No slippage of the discs was noted, nor any abrasion or lifting of the sprayed coating.

Another batch was tested by covering the coating with a layer of finely divided cigarette ashes. Loose ash was removed with a gentle flow of air and then the slip test carried out again. No slippage of discs was noted.

CONTROL EXAMPLE 1

A 5% solution of poly(isobutylene) having a weight average molecular weight of about 150,000 and the chlorinated solvent of Example 1 was sprayed onto a turntable. During this spraying the polymer precipitated out of solution and a discontinuous, non-uniform polymer coating resulted.

CONTROL EXAMPLE 2

A solution of the styrene block copolymer rubber of Example 1 by itself was dissolved as a 13% solution in xylene and in a mixed xylene-methyl ethyl ketone solvent and sprayed onto turntables and tested with capacitance electronic discs after standing for three days and after seven days. The discs slipped during acceleration and deceleration in all cases. After several plays, the coating began to wear off badly.

Thus the block copolymer rubber by itself was ineffective for the present application.

CONTROL EXAMPLE 3

Strips of black foamed polyurethane rubber with an adhesive backing were applied to the edge of the video disc player turntable. Freshly lubricated discs were tested on the turntables and no slippage occurred. However after exposure to ozone-enriched air, designed as an aging test, the material became gummy and tacky, indicating insufficient stability of this type of material.

I claim:

1. A record turntable adapted for rotation during playback of a record supported by said turntable having around its perimeter a uniform antifriction coating containing poly(isobutylene) having a weight average molecular weight of from about 50,000 to about 100,000.

2. A turntable according to claim 1 wherein the coating contains poly(isobutylene) and a minor amount of up to about 15 percent by weight of the poly(isobutylene) of a styrene-rubber block copolymer.

3. A turntable according to claim 2 wherein the block copolymer is present in amounts of from about 5–15% by weight of the poly(isobutylene).

* * * * *